United States Patent
Schottland

[19]

[11] Patent Number: 5,927,986
[45] Date of Patent: Jul. 27, 1999

[54] DRIVER TRAINING DEVICE FOR VISUAL AVOIDANCE SIMULATION

[76] Inventor: Miriam Schottland, P.O. Box 18825, Washington, D.C. 20036

[21] Appl. No.: 08/841,675

[22] Filed: Apr. 30, 1997

[51] Int. Cl.⁶ .................................................. G09B 9/04
[52] U.S. Cl. .................................. 434/68; 434/66; 446/73
[58] Field of Search .................................. 434/29, 61, 62, 434/66, 68; 446/69, 388, 487, 488, 73, 72, 369, 385, 387; 404/9, 10; 116/63 R, 63 P, 63 C; 40/612; 482/148; 472/84

[56] References Cited

U.S. PATENT DOCUMENTS

| | | | |
|---|---|---|---|
| 2,942,571 | 6/1960 | White | 116/63 C X |
| 3,192,889 | 7/1965 | Crudgington . | |
| 3,608,210 | 9/1971 | O'Shea | 434/68 |
| 4,925,334 | 5/1990 | Beard | 404/9 |
| 5,467,548 | 11/1995 | Ross | 40/612 |

FOREIGN PATENT DOCUMENTS

| | | | |
|---|---|---|---|
| 918963 | 4/1982 | U.S.S.R. | 434/62 |
| 1078785 | 8/1967 | United Kingdom | 116/63 P |
| 2263299 | 7/1993 | United Kingdom | 404/9 |
| 2270332 | 3/1994 | United Kingdom | 404/9 |
| 2271594 | 4/1994 | United Kingdom | 404/9 |

*Primary Examiner*—Jeffrey A. Smith
*Attorney, Agent, or Firm*—Joseph J. Zito

[57] ABSTRACT

Driver training obstacles which are designed to catch and retain the attention of drivers to force a conscious effort to avoid focusing on the obstacle and to take hitting the obstacle as a serious matter. The obstacles fit over conventional traffic cones or other conical supports. They are shaped, colored and designed to visually simulate a variety of objects, including common animal and objects found along the roads, as well as abstract or random designs and objects. Lights and reflective features are also incorporated into some obstacles. Constructed as an envelope from a single or multiple pieces of material, the obstacles fit over one or more cones and can be unitary, elongated or arranged as a flock or group of objects. The obstacles catch and retain the attention of drivers more effectively than conventional standard traffic cones, because of their interesting and attractive features and appearance, they are more difficult to avoid and are a more effective training tool.

15 Claims, 4 Drawing Sheets

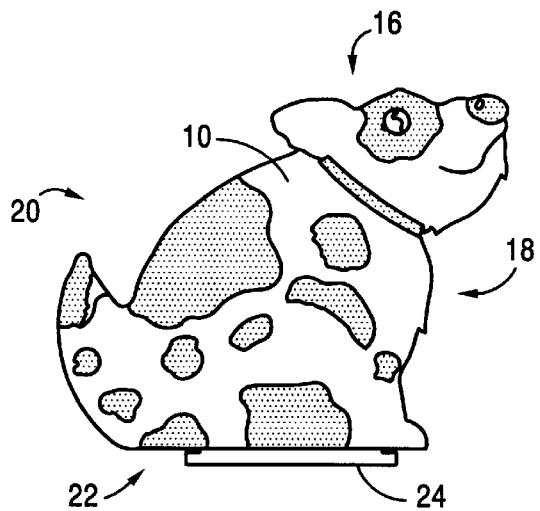
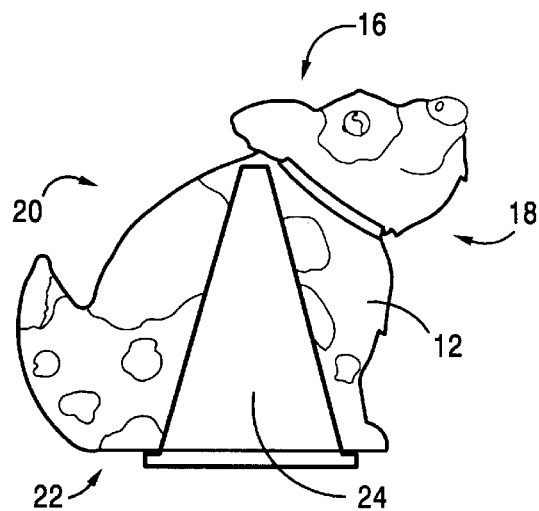
FIG. 1A  FIG. 1B
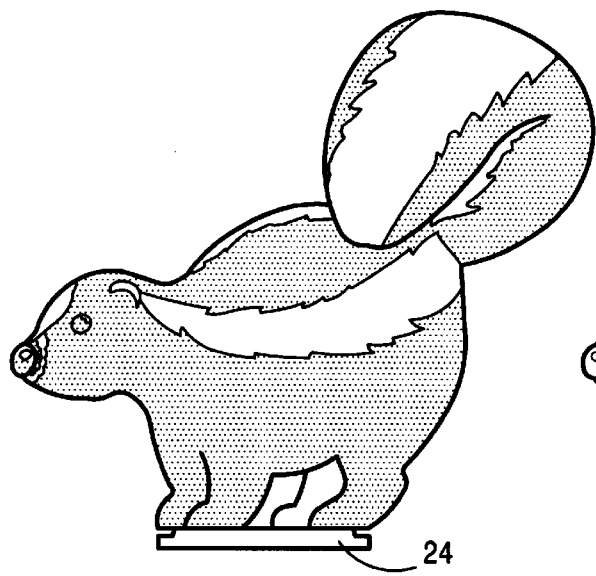
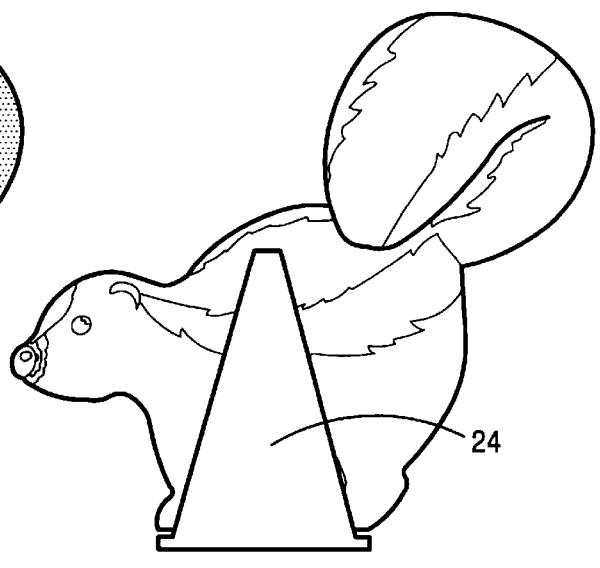
FIG. 2A  FIG. 2B

DRIVER TRAINING DEVICE FOR VISUAL AVOIDANCE SIMULATION

BACKGROUND OF THE INVENTION

The present invention relates to apparatus and methods for proper instruction of drivers in the art of driving. More specifically, the present invention relates to objects or obstacles placed in the path of a vehicle to train a driver in obstacle avoidance.

The most important aspect of automotive safety is the ability of drivers to avoid accidents. Safety devices, both passive and active, can only act to reduce damage or injury to passengers and drivers after an accident occurs. The most effective means for reduction of injury is to avoid or minimize the crash. All drivers must learn the law of driving before they are issued a license and must have the basic ability to operate and control a vehicle. However, the amount of instruction and experience of the average driver falls far short of that needed to effectively avoid accidents.

One of the most common difficulties in accident avoidance is the natural tendency to look or even fixate on the object we are about to hit. There is also a natural tendency to drive towards what we are looking at. The eye-hand coordination is both natural behavior and a result of the driving habits taught and developed as part of the basic skill of vehicle operation. This natural tendency must be trained out of a driver to improve his/her driving skills.

Automobile drivers often enroll in driver instruction or driver safety training courses. Those courses which include actual in-car driver training, instruct drivers in the art of driving through a series of exercises which most always include driving through a course defined by standard orange traffic cones. These instructional courses include additional cones as obstacles to be avoided. Most drivers, whether they are teens or adults, focus on the cones, especially the cones that should be avoided. Focus on the cones usually causes the driver to steer toward the very object to be avoided. The result is an almost unavoidable collision with the cone.

Unfortunately, the use of orange traffic cones as obstacles often does not convey the seriousness of collision avoidance. Drivers do not see the cone as a serious object to be avoided. Collision with a cone is often dismissed in a whimsical manner and is regarded by some as a violation of a traffic rule and not as a safety issue.

SUMMARY OF THE INVENTION

The present invention teaches the construction and use of driver training obstacles which are designed to catch and retain the attention of drivers to force a conscious effort to avoid focusing on the obstacle and to take hitting the cones as a serious matter. The obstacles of the present invention will catch and retain the attention of drivers more effectively than conventional standard traffic cones. Because of their interesting and attractive features and appearance, the obstacles of the present invention will be more difficult to avoid and will therefore be a more effective training tool.

It is an object of the present invention to provide a driver training obstacle which will force a driver to make a conscious effort not to focus on the obstacle and to force the driver to think to look where the vehicle should go and not to focus on where it is presently headed.

It is an object of the present invention to provide an obstacle which will aid in teaching the driver that it is important to look where they want the vehicle to go.

The obstacles of the present invention are constructed from soft material so as to avoid damage to a vehicle in the event of collision. They can be constructed of foam, foam rubber, plastic, soft polymers and the like.

The obstacles can be constructed in the form of animals, objects, abstract shapes or other attractive, interesting or attention catching appearances, for example animals, objects, blinking lights and the like.

The obstacles are preferably waterproof and colorfast and constructed to disguise the cones by slipping over and covering the cones. Any design is preferably embedded in the material to provide scuff resistance which would otherwise diminish the effectiveness of the obstacle.

BRIEF DESCRIPTION OF THE FIGURES

FIG. 1A is an exterior view of a first exemplary embodiment of the present invention depicting an obstacle in the shape of a dog.

FIG. 1B is an internal view of the barrier of FIG. 1A with one side removed to illustrate the conical support for the obstacle.

FIG. 2A is an exterior view of a second exemplary embodiment of the present invention depicting an obstacle in the shape of a skunk.

FIG. 2B is an internal view of the barrier of FIG. 2A with one side removed to illustrate the conical support for the obstacle.

DESCRIPTION OF THE EXEMPLARY EMBODIMENTS

Figure 5A:
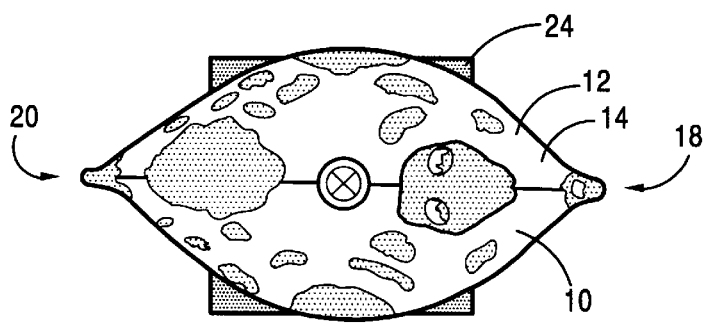
FIGS. 5A and B are top and bottom views of the obstacle of FIG. 1A.
Figure 5B:
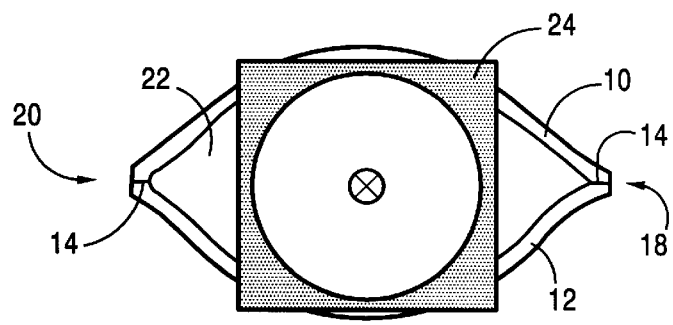

As illustrated in FIGS. 1 and 5, the driving obstacle of the present invention can be made from two flat flexible sheets of material 10 and 12, which are joined at a seam 14. The seam 14 joins the top 16, front 18 and back 20 of the obstacle together while leaving the bottom 22 open. The open bottom 22 can then be placed over a standard traffic cone 24 as illustrated in FIGS. 1 through 5.

Figure 6A:
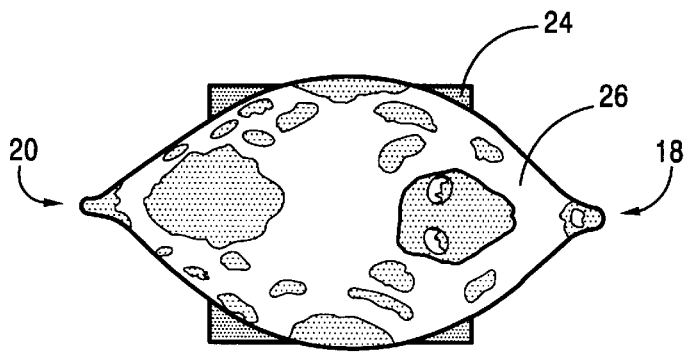
FIGS. 6A and B are top and bottom views of a one piece design, without the central seam of FIGS. 5A and B.
Figure 6B:
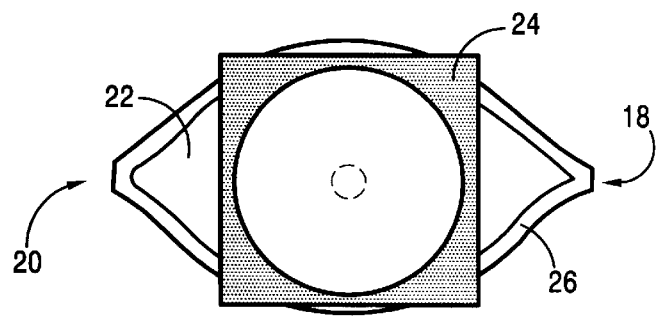

FIGS. 6A and B illustrate an alternative embodiment wherein the obstacle is formed of a single piece of material 26. The front 18, back 20 and top do not have a seam. This obstacle can be molded, rolled or formed by any appropriate technique.

The obstacles can be formed and decorated in any variety of visual configurations which enhance the above described problem of attracting the attention of the driver. For example, a dog configuration is illustrated in FIG. 1, a skunk in FIG. 2, an alligator in FIG. 3 and an abstract shape in FIG. 4. These are intended as illustrative and not limiting to the available configurations within the scope of the invention.

The intent of the appearance of the obstacle is to enhance the natural tendency to attract the attention of a driver. The driving obstacles of the present invention are designed to attract and retain the attention of a driver to a greater degree than conventional traffic cones. This will enhance the natural distractive effect of obstacles and will require a greater conscious effort to avoid, thereby enhancing the effectiveness of the driver training program which teaches obstacle avoidance through in-car driving practice.

The present invention teaches simplicity of construction, two flat pieces bonded along a single seam, a unitary formed piece, or other appropriate construction of durable non-damaging material. The present invention teaches simplicity of use, it slips over a standard traffic cone or other supporting object.

Figure 3A:
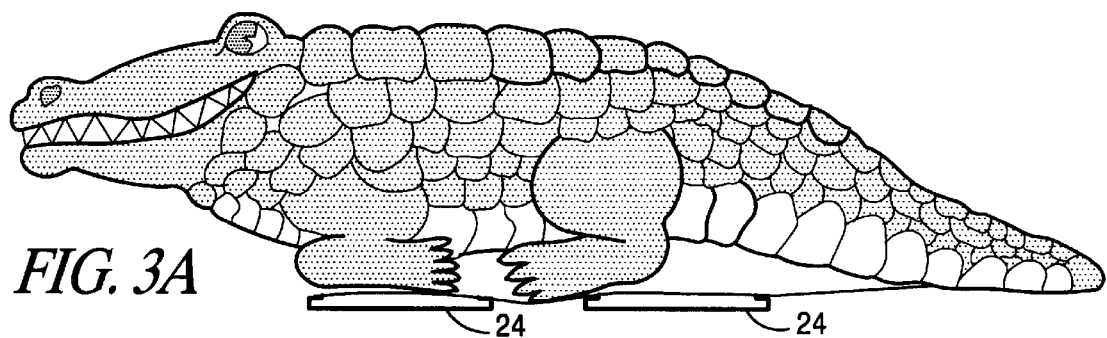
FIG. 3A is an exterior view of a first exemplary embodiment of the present invention depicting an obstacle in the shape of a alligator.
Figure 3B:
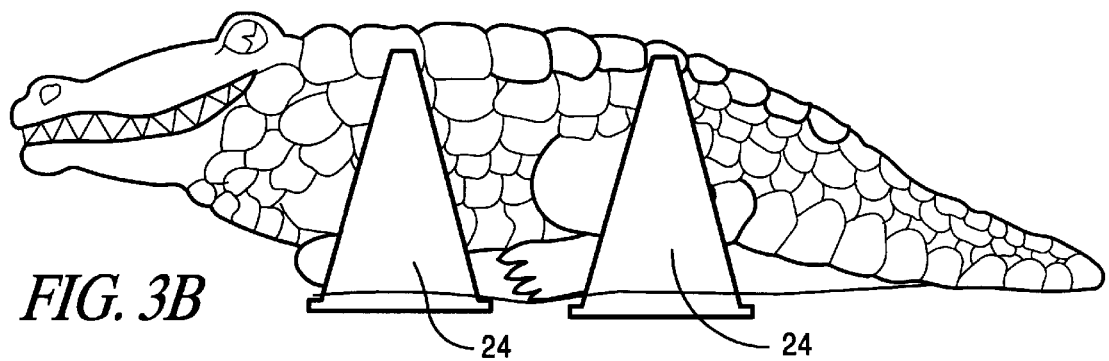
FIG. 3B is an internal view of the barrier of FIG. 3A with one side removed to illustrate the two conical supports for the obstacle.
Figure 4A:
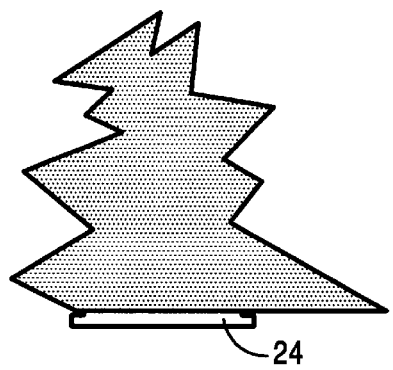
FIG. 4A is an exterior view of a fourth exemplary embodiment of the present invention depicting an obstacle in the shape of a abstract shape.
Figure 4B:
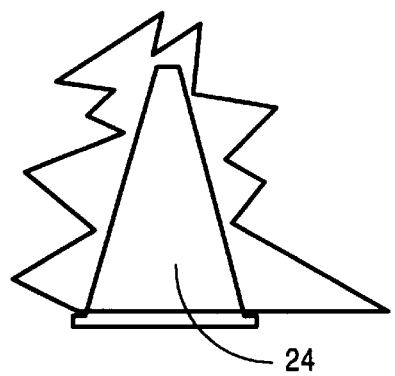
FIG. 4B is an internal view of the barrier of FIG. 4A with one side removed to illustrate the conical support for the obstacle.

It is sometimes desirable to use an object larger than a single traffic cone in driver training. FIG. 3 illustrates an example of the use of an extended obstacle with a plurality of cones. The alligator obstacle of FIG. 3 uses two standard traffic cones 24 for support.

Figure 7:
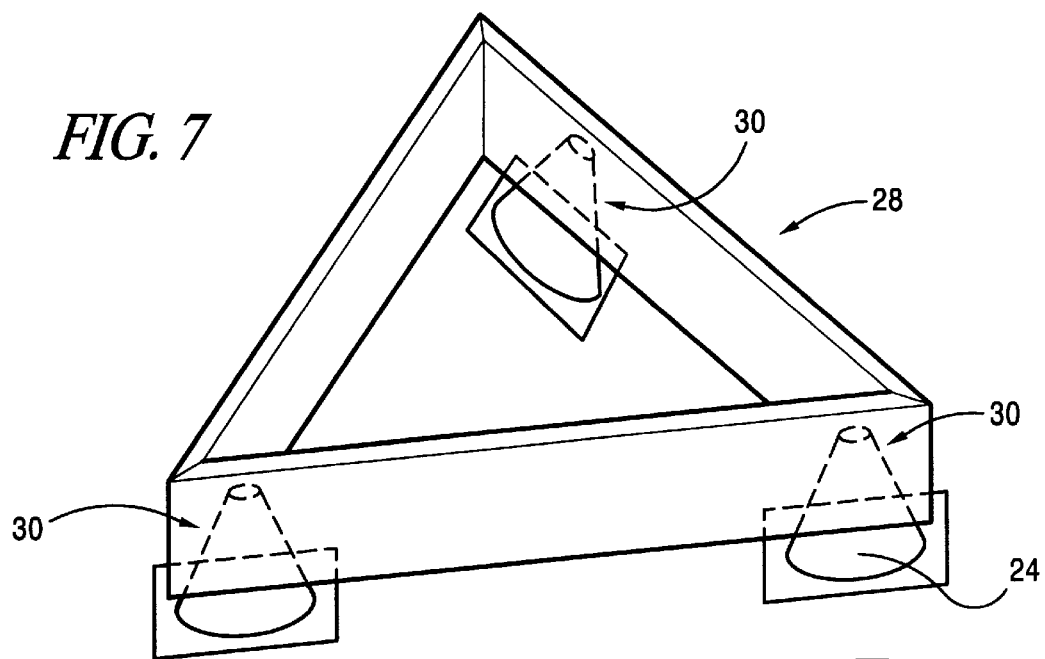
FIG. 7 is a perspective view, illustrating a multi-sided driving obstacle supported by a plurality of non-linearly arranged cones.

It is possible within the scope of the inventive concept taught herein to use any number of cones to support an object of any desired size, dimension or configuration. For example it may be desired to have a object with depth and therefore the supporting traffic cones could be arranged in a non-linear configuration with a multi-sided obstacle, as illustrated in FIG. 7, instead of a single line as illustrated in FIG. 3. FIG. 7 illustrates a flock or group of objects 28 in a triangular configuration. The obstacle could be a flock of geese, rectangular group or any desired object or objects in any desired shape within the scope and objects of the invention. Alternatively, a group of unrelated objects in varying configurations would also fall within the scope of the teachings. The cones 24 in FIG. 7 are inserted in the cone openings 30 arranged within the sections of the obstacle 28.

For support, the obstacle may simply be placed over a traffic cone and rest there by its own weight. This will be acceptable for most circumstances, however, under some conditions it may be desirable to provide additional securing of the obstacle to the supporting cone. FIG. 8 illustrates several examples for securing the obstacle to a cone by providing extensions extending down from the center of the obstacle into the central opening in the top of the traffic cone.

Figure 8A:
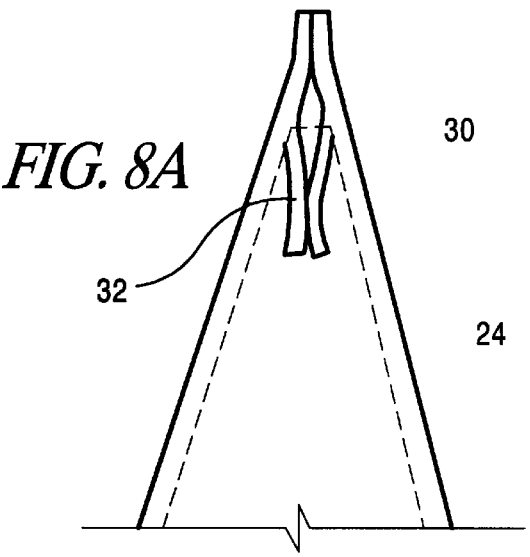
FIGS. 8A through D are cross sectional side views illustrating exemplary methods for securing an obstacle of the present invention to a conical support.
Figure 8B:
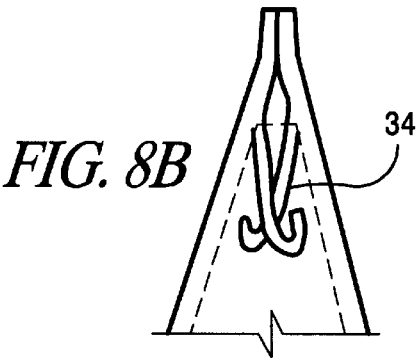
Figure 8C:
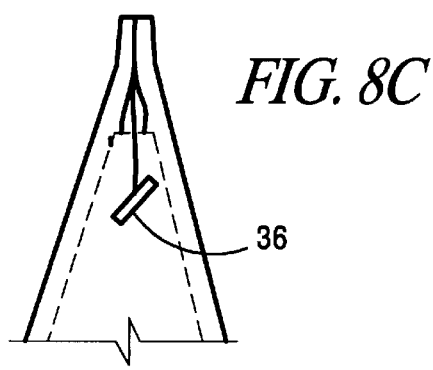
Figure 8D:
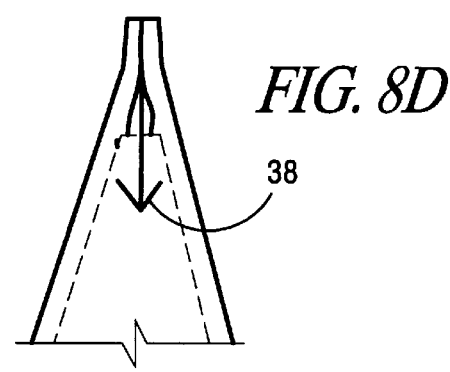

FIG. 8A illustrates two flaps 30 which enhance the gripping between the cone 24 and the obstacle 32 to reduce separation. FIG. 8B illustrates hooked flaps 34 which resist separation because they must be compressed for removal. FIGS. 8C and 8D illustrate the use of shaped items 36 and 38 suspended from the center of the obstacle to operate in the manner of an expansion plug to resist removal of the obstacle 32 from the cone 24.

Many other devices and methods can be constructed and implemented given the teachings of the present invention as described above and those are considered within the scope of the inventive concept as herein taught. The above description is for the purpose of illustrating several exemplary embodiments of the present invention and is not intended to limit the scope of the invention as defined in the following claims:

1. A driver training device constructed for use with a conventional traffic cone or other conical support, comprising:

at least one exposed surface having a visual appearance for attracting the attention of the driver of a vehicle, and at least one engagement surface for contact with and support by said conical support; and an anchor for securing said device to said conical support, wherein said anchor includes a portion inserted into an upper opening of said conical support and having an expandable member for resisting removal after insertion.

2. A driver training device constructed for use with a conventional traffic cone or other conical support, comprising:

at least one exposed surface having a visual appearance for attracting the attention of the driver of a vehicle, and at least one engagement surface for contact with and support by said conical support; and an anchor for securing said device to said conical support, wherein said anchor includes a portion inserted into an upper opening of said conical support and having a pivotable member for resisting removal after insertion.

3. A driver training device constructed for use with a conventional traffic cone or other conical support, comprising:

two stacked planer sheets attached along a first portion of their adjacent edges and having an opening along a second portion of their adjacent edges;

at least one exposed surface on one of said sheets having a visual appearance of a three dimensional object for attracting the attention of the driver of a vehicle, and at least one engagement cavity between said sheets formed by flexing said sheets and positioning said sheets over said conical support with said conical support extending through said edge opening to support said device, wherein said driver training device obscures said conical support from the view of a driver being trained, substantially eliminating said conical support from the view of said driver transforming said support and device combination into said three dimensional object for perception by said driver as an interesting target for distracting the eyes and attention of said driver.

4. The driver training device of claim 3, wherein the training device is constructed of soft, pliable, resilient material.

5. The driver training device of claim 4, wherein said material is a soft material selected from the group of foam, foam rubber, plastic or other soft polymers.

6. The driver training device of claim 3, wherein the training device is constructed in the form of an animal.

7. The driver training device of claim 3, wherein the training device is constructed in the form of an abstract shape.

8. The driver training device of claim 3, wherein the training device is constructed in the form of a plurality of animals.

9. The driver training device of claim 3, wherein the training device is constructed in the form of a group of objects.

10. The driver training device of claim 3, wherein the training device includes blinking lights.

11. The driver training device of claim 3, wherein the training device includes reflective surfaces.

12. The driver training device of claim 3 constructed for use with at least two conventional traffic cones or other conical supports, wherein said at least one engagement cavity is configured for contact with and support by said at least two conical supports, and as a substantially elongated conical opening capable of accommodating at least two conical supports, on a surface of the device opposite said exposed surface, when said device is supported by said conical supports.

13. The driver training device of claim 12, wherein said substantially elongated conical opening collapses and said device lies flat when removed from said conical supports.

14. A driver training device constructed for use with a plurality of conventional traffic cones or other conical supports, comprising:

a plurality of exposed surfaces having a combined visual appearance of a three dimensional group of objects for attracting the attention of the driver of a vehicle, and a plurality of engagement openings for contact with and supported by said plurality of conical supports said surfaces being independently configured as conical openings opposite said surfaces, each capable of accommodating at least one conical support on a surface of the device opposite one of said exposed surfaces; such that said plurality of exposed surfaces obscures said plurality of supports from view, causing said plurality of supports and said plurality of exposed surfaces to acquire the visual appearance of said three dimensional group of objects, when said device is supported by said conical supports.

15. The driver training device of claim 14, wherein said substantially conical openings collapse and said device folds flat when removed from said conical supports.

* * * * *